(12) United States Patent
Gazzani

(10) Patent No.: US 9,080,249 B2
(45) Date of Patent: Jul. 14, 2015

(54) ANODIZING TREATMENT STATION IN A VERTICAL PAINT PLANT OF ALUMINUM PROFILES AND PAINT PLANT INTEGRATING SUCH ANODIZING TREATMENT STATION

(75) Inventor: Simeone Gazzani, Castelbelforte (IT)

(73) Assignee: SAT (Surface Aluminum Technologies) S.p.A., Verona (IT)

( * ) Notice: Subject to any disclaimer, the term of this patent is extended or adjusted under 35 U.S.C. 154(b) by 375 days.

(21) Appl. No.: 13/522,802

(22) PCT Filed: Jan. 25, 2011

(86) PCT No.: PCT/EP2011/050985
§ 371 (c)(1),
(2), (4) Date: Jul. 18, 2012

(87) PCT Pub. No.: WO2011/092160
PCT Pub. Date: Aug. 4, 2011

(65) Prior Publication Data
US 2012/0285824 A1    Nov. 15, 2012

(30) Foreign Application Priority Data

Jan. 26, 2010   (IT) .............................. MI2010A0096

(51) Int. Cl.
*C25D 17/06*   (2006.01)
*C25D 11/04*   (2006.01)
*C25D 11/00*   (2006.01)

(52) U.S. Cl.
CPC .............. *C25D 11/04* (2013.01); *C25D 11/005* (2013.01); *C25D 17/06* (2013.01)

(58) Field of Classification Search
USPC ............................................. 204/202, 275.1
See application file for complete search history.

(56) References Cited

U.S. PATENT DOCUMENTS

| 4,337,134 A | 6/1982 | Norman |
| 5,927,472 A | 7/1999 | Neef |
| 2004/0206713 A1 | 10/2004 | Lloyd et al. |

FOREIGN PATENT DOCUMENTS

JP       H06-158394    *  6/1994    ............. C25D 17/08

OTHER PUBLICATIONS

International Search Report and Written Opinion; International Application No. PCT/EP2011/050985; International Filing Date Jan. 25, 2011; 8 pages.

*Primary Examiner* — Keith Hendricks
*Assistant Examiner* — Stefanie S Wittenberg
(74) *Attorney, Agent, or Firm* — Blank Rome LLP

(57) ABSTRACT

The anodizing treatment station (3) in a vertical paint plant (2) of aluminum profiles hanging in succession by means of hooks (8) on a main overhead conveyor (4) moving along a main conveyor line (5) which passes through at least one pre-treatment station and at least one powder or liquid paint station, comprises at least one oxidation bath (9) and a secondary overhead conveyor (10) moving along secondary conveyor line (11) in synchronism with said main conveyor (4), the main conveyor line (5) having a first main loading and/or unloading segment (12), facing said oxidation bath (9), wherein specific first main loading and/or unloading means (13) are adapted to transfer groups (8c) of hooks (8) from said main conveyor (4) to said oxidation bath (9) and/or vice versa, in that the secondary conveyor line (11) has a first secondary loading and/or unloading segment (14), facing said oxidation bath (9), wherein specific first secondary loading and/or unloading means (15) are adapted to transfer groups (8c) of hooks (8) from said secondary conveyor (10) to the oxidation bath (9) and/or vice versa, a first diverter (21) being provided which upstream of the oxidation bath (9) alternately transfers to the secondary conveyor (10) groups (8c) of hooks (8) conveyed by the main conveyor, and a second diverter (22) which to recompose the continuous succession of hooks (8) downstream of the oxidation bath (9) transfers the groups (8c) conveyed by the secondary conveyor (10) to the segments (8b) without hooks (8).

14 Claims, 5 Drawing Sheets

Figure 1:
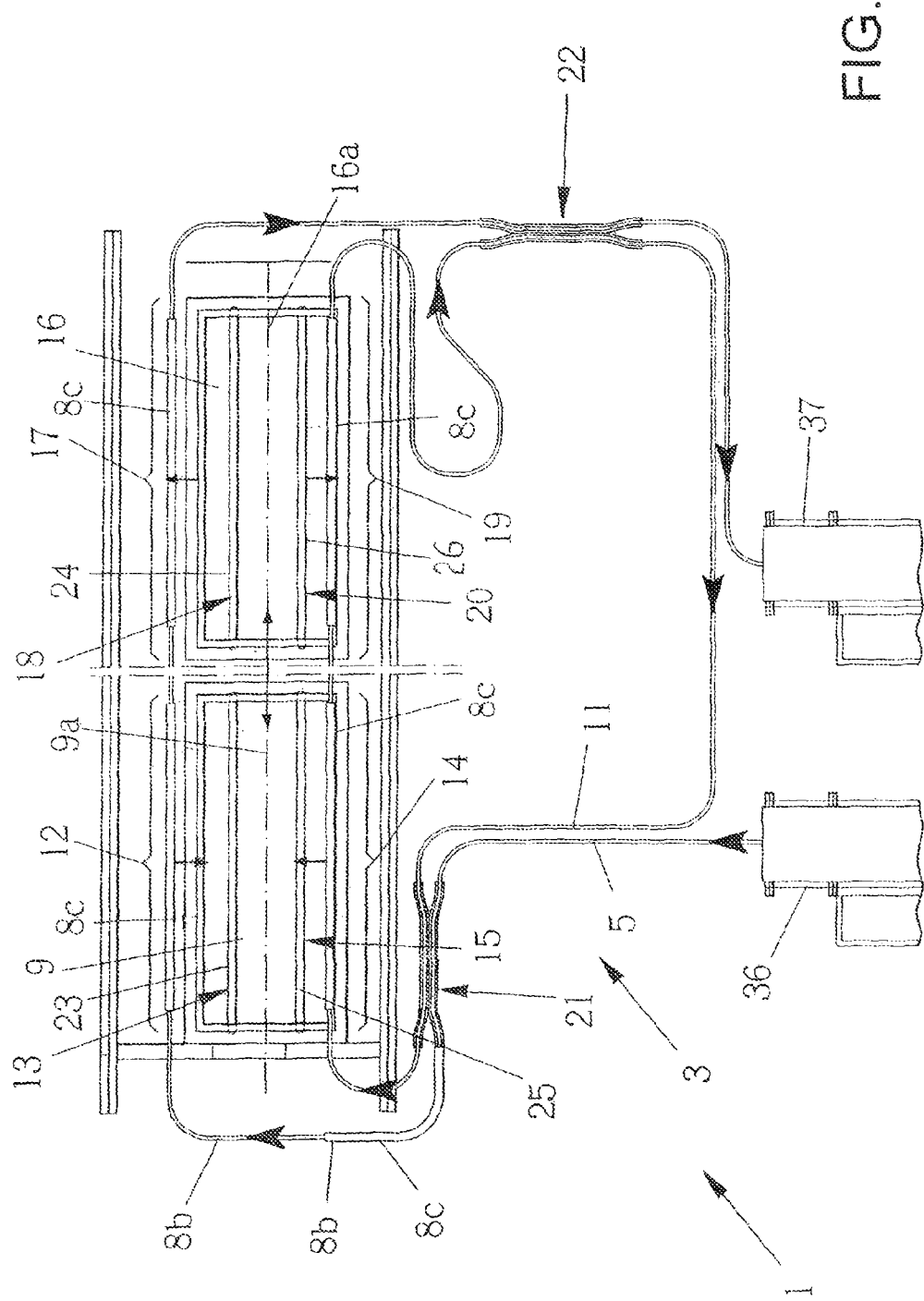

ANODIZING TREATMENT STATION IN A VERTICAL PAINT PLANT OF ALUMINUM PROFILES AND PAINT PLANT INTEGRATING SUCH ANODIZING TREATMENT STATION

The present invention relates to an anodizing treatment station in a vertical paint plant of aluminium profiles and to a paint plant integrating such station for the anodizing treatment.

Currently, the treatment of aluminium profiles before painting can provide a treatment of anodic oxidation which enhances its resistance characteristics to adverse environments and to the filiform corrosion.

The anodizing process provides among other things a basin, making the so-called galvanic bath, containing a solution based on concentrated sulfuric acid at ~200 g/l, in which laterally the cathodes are immersed. The anode is made by the batches of profiles which must be anodized. To these two electrodes a potential difference is imposed, through a direct current generator connected to the cathode with a negative sign and to the anode with a positive sign. In such conditions, a process is triggered of surface oxidation of the aluminium immersed in the basin, which generates so a hard and compact layer to protect it from aggressions of environmental agents.

The relation which determines the oxide layer that will form substantially depends on the current density value (expressed in $A/dm^2$) to which the profiles immersed in the basin are exposed, and on the permanence time in the basin.

Obviously, just from the complexity of the hooking of the pieces in order to guarantee a suitable and individual specific electrical conductivity for this galvanic treatment, drawbacks derive meaning a loss of time, substantial manpower, handling of material to be treated in the different phases of processing and storing of themselves.

The anodizing station also comprises, in order to get an acceptable productivity, in general a rather important an overall length, discouraging its direct integration in a paint plant.

Technical task of the present invention is to provide an anodizing treatment station in a vertical paint plant of aluminium profiles and a paint plant integrating such anodizing treatment station, which overcome the drawbacks lamented in the known art.

Within this technical task, the aim of the invention is to integrate the anodizing treatment in the process going from the pre-treatment to the painting of a traditional vertical liquid or powder paint plant of aluminium profiles, without altering the characteristics of productivity and manpower utilized, and without altering the other functional and structural characteristics of the paint process, also by maintaining unchanged the use of the classical hanging of the profiles by means of steel hooks.

The technical task and these and other aims according to the present invention, are reached by realizing an anodizing treatment station in a vertical paint plant of aluminium profiles hanging in succession by means of hooks on a main overhead conveyer moving along a main conveyor line which passes through at least one pre-treatment station and at least one powder or liquid paint station, characterized in that it comprises at least one oxidation bath and a secondary overhead conveyor moving along a secondary conveyor line in synchronism with said main conveyor, in that the main conveyor line has a first main loading and/or unloading segment, facing said oxidation bath, wherein specific first main loading and/or unloading means are adapted to transfer groups of hooks from said main conveyor to said oxidation bath and/or vice versa, in that the secondary conveyor line has a first secondary loading and/or unloading segment, facing said oxidation bath, wherein specific first secondary loading and/or unloading means are adapted to transfer groups of hooks from said secondary conveyor to said oxidation bath and/or vice versa, in that it comprises a first diverter which upstream of the oxidation bath alternately transfers groups of hooks conveyed by the main conveyor, and a second diverter which to recompose the continuous succession of hooks downstream of the oxidation bath transfers the groups conveyed by the secondary conveyor to the segments without hooks.

Preferably, the length of the segment of the main conveyor line between first and second diverter and including the first main loading and/or unloading segment is equal to the length of the segment of the secondary conveyor line between the first and second diverter and including the first secondary loading and/or unloading segment.

Preferably, the length of the segment of the main conveyor line between the first diverter and the first main loading and/or unloading segment is equal to the sum of the length of the segment of the secondary conveyor line between the first diverter and the first secondary loading and/or unloading segment and of the length occupied by a group of hooks on an overhead conveyor.

Preferably, all the groups of hooks present in the main and secondary conveyors each have the same number of hooks and each occupy a segment of the same length in the main and secondary conveyors.

Preferably, the anodizing treatment station comprises at least one wash bath in cascade with the oxidation bath, in that the main conveyor line has a second main loading and/or unloading segment, facing said wash bath, wherein specific second main loading and/or unloading means are adapted to transfer groups of hooks from said main conveyor to said wash bath and/or vice versa, and in that the secondary conveyor line has a second secondary loading and/or unloading segment, facing said wash bath, wherein specific second secondary loading and/or unloading means are adapted to transfer groups of hooks from said secondary conveyor to said wash bath and/or vice versa.

Preferably, the first and respectively second main loading and/or unloading means comprise a first and respectively a second plurality of main swing trays positioned in a reciprocally interchangeable manner in the oxidation bath and in the wash bath, in that the first and respectively second secondary loading and/or unloading means comprise a first and respectively a second plurality of secondary swing trays positioned in a reciprocally interchangeable manner in the oxidation bath and in the wash bath, and in that each swing tray has a removable coupling seat of a profile hanging hook.

Preferably, a corresponding horizontal conveyor is present in each first and second, main and secondary loading and/or unloading segment to transfer the hooks of the profiles of the main and secondary conveyors to the swing trays and vice versa.

Preferably, the horizontal conveyors have a synchronized drive for transfer to the oxidation bath of each group of hooks present in the first main loading and/or unloading segment and vice versa, simultaneous to transfer to the main and secondary conveyors of each group of hooks present in the wash bath and vice versa.

Preferably, the transfer to the oxidation bath of each group of hooks present in the first main loading and/or unloading segment and vice versa simultaneous to transfer to the main and secondary conveyors of each group of hooks present in the wash bath and vice versa is performer dynamically with the main and secondary conveyers in movement.

Alternatively, the transfer to the oxidation bath of each group of hooks present in the first main loading and/or unloading segment and vice versa simultaneous to transfer to the main and secondary conveyors of each group of hooks present in the wash bath and vice versa is performed statically by temporarily stopping the main and secondary conveyors.

Preferably, the oxidation bath has electric contact means at the emersed end, of the profiles, comprising a first single electric contact of suitable width to touch all the profiles hanging on at least one group of hooks in the oxidation bath and a plurality of second electric contacts movable separately from one another.

Preferably, the first electric contact and the plurality of second separate electric contacts can move parallel in opposite directions reciprocally away from each other to a position, which allows interposing of the profiles and reciprocally towards each other to a position in which the first contact is in contact with a first side of the profiles and the second contacts as a result of a differential movement, are in contact, individually or in groups, with a second side of the profiles.

Preferably, the second electric contacts all have the same width.

Preferably, the second electric contacts have a constant spacing.

Figure 2:
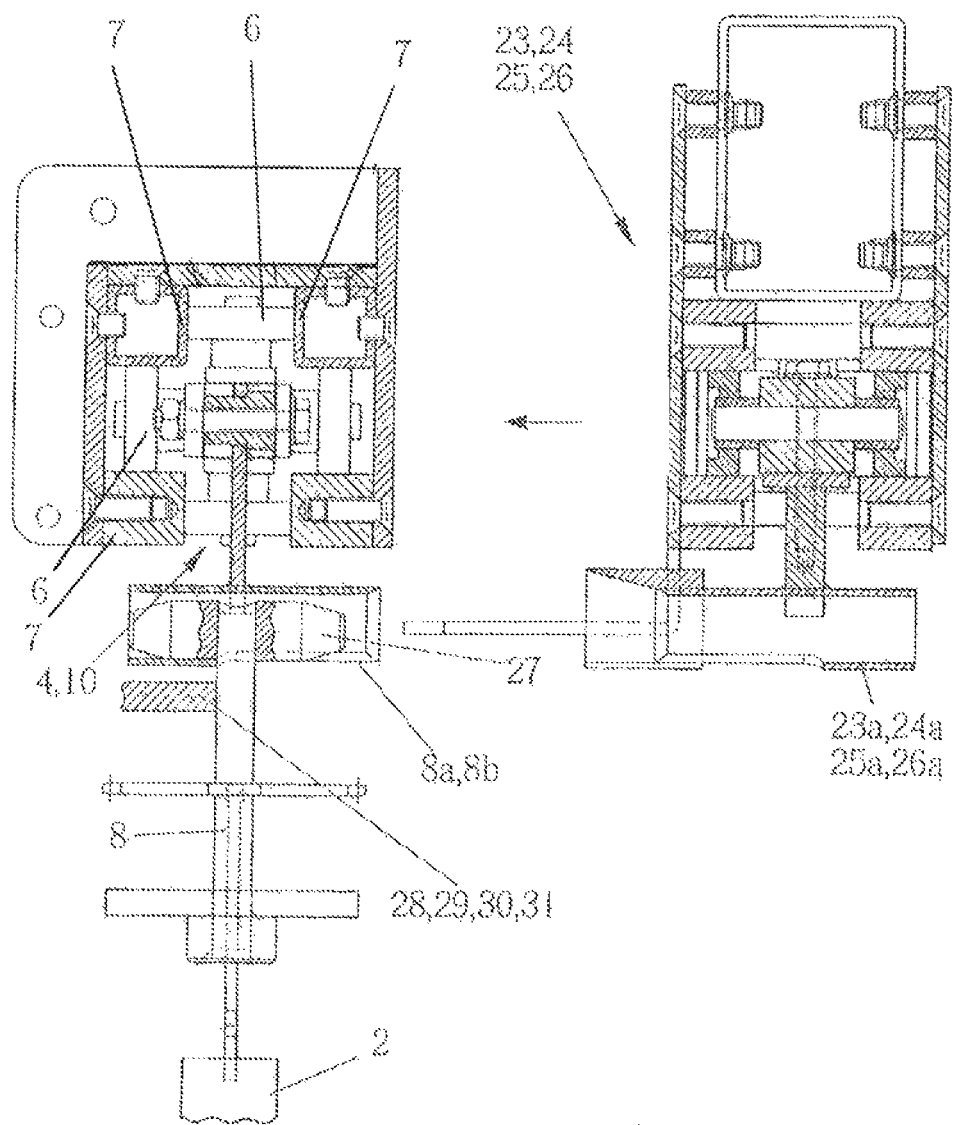
Figure 3:
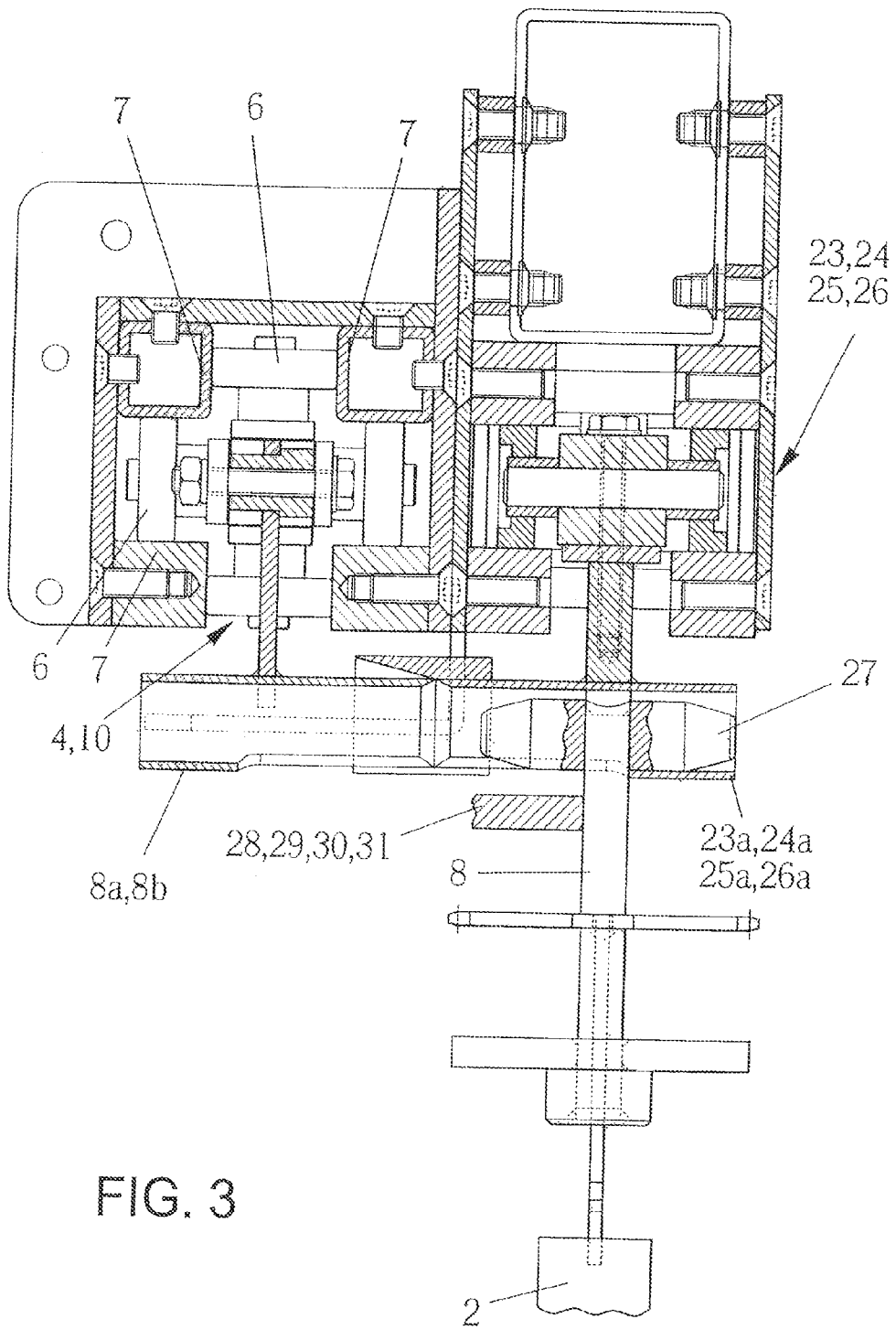
Figure 4:
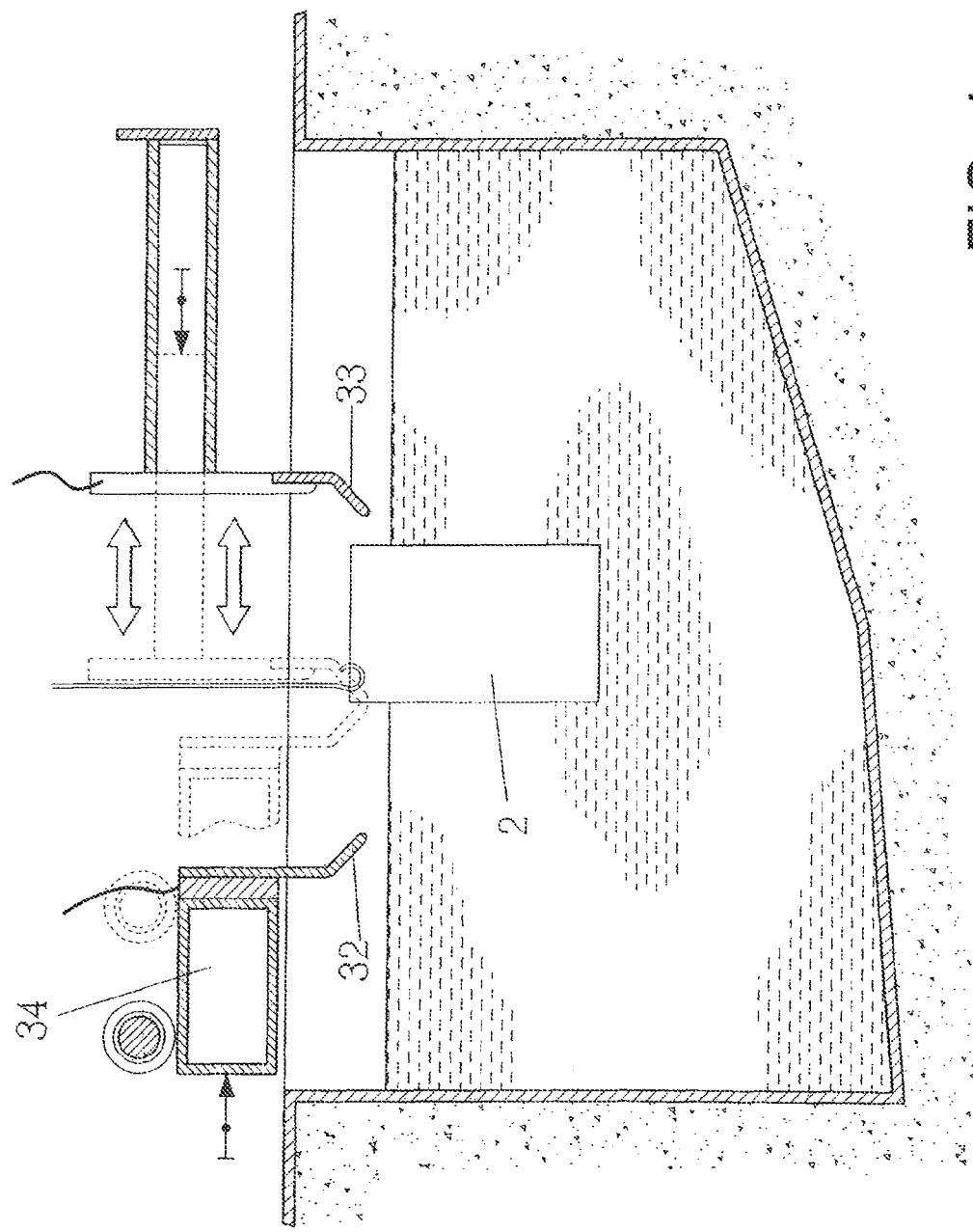
Figure 5:
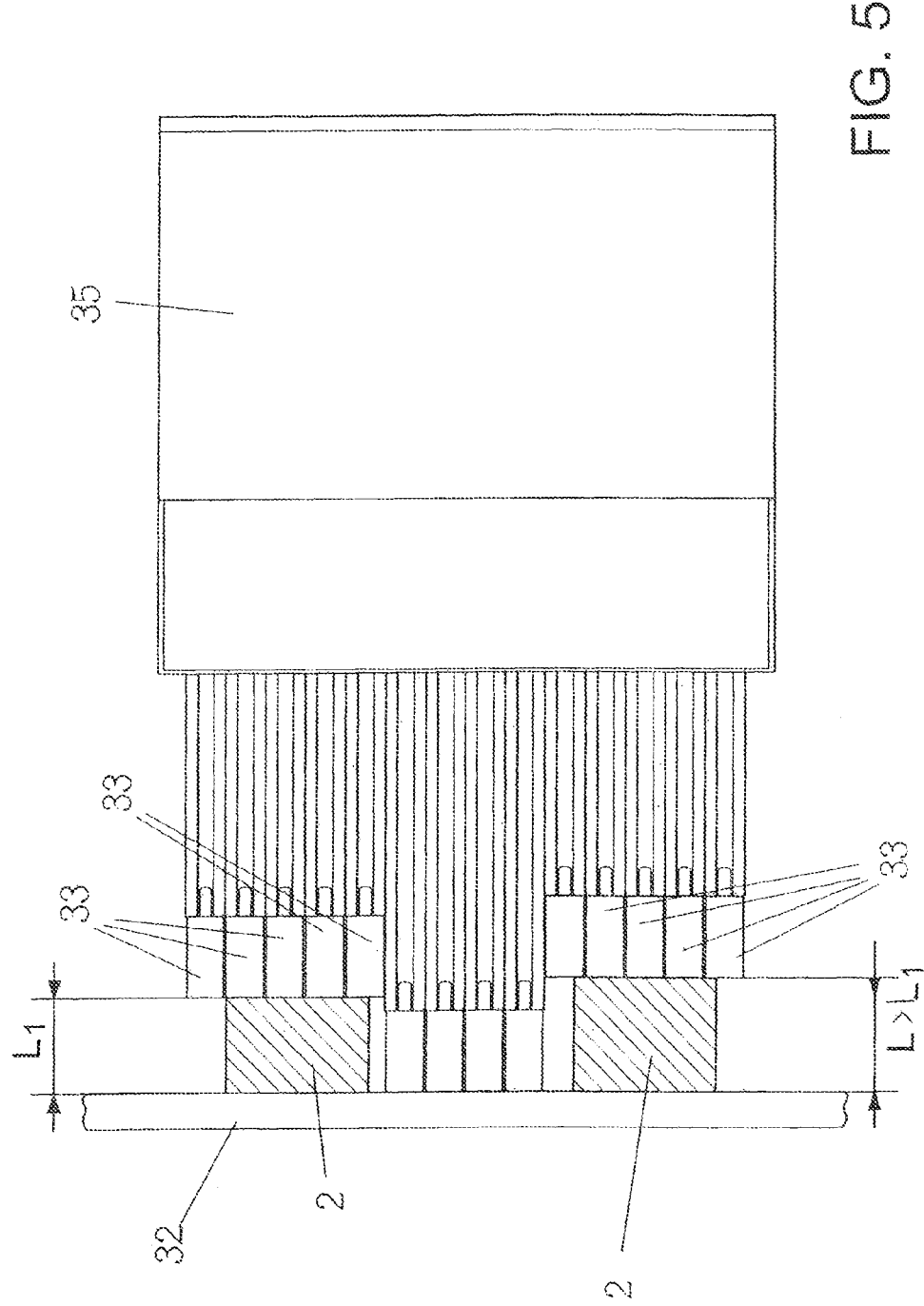

Further characteristics and advantages of the invention will be more evident from the description of a preferred but non exclusive embodiment of the anodizing treatment station in a vertical paint plant of aluminium profiles and of the paint plant integrating such anodizing treatment station according to the finding, illustrated in an indicative and non limitative way in the annexed drawings, in which:

FIG. 1 schematically shows a portion of the paint plant with the anodizing station integrated and in particular interposed between two pre-treatment stations;

FIG. 2 schematically shows the approaching step of a swing tray to an overhead conveyor;

FIG. 3 schematically shows the exchanging position of the hook from an overhead conveyor to swing tray;

FIG. 4 schematically shows a lateral side view of the oxidation bath with the first and second electric contacts in the position of maximum aperture; and FIG. 5 schematically shows a plan view from above of the first electric contacts in the contact position with the profiles present in the oxidation bath.

With reference to the cited figures, a vertical paint plant 1 is shown of aluminium profiles 2 hanging in succession by means of hooks 8 on a main overhead conveyor 4 moving along a main conveyor line 5 going from an initial inlet station (not shown) of the profiles 2 to paint up to an end outlet station (not shown) of the painted profiles 2.

The main conveyor line 5 has the shape of a closed ring, in order that the main conveyor 4 can perform repeated cycles, so that after the outlet of the painted profiles 2 to the end station returns to the initial station for charging new profiles 2 to paint.

The main overhead conveyor 4 has sliding rolls 6 along a fixed guide 7, and carries a plurality of seats 8a for the insertion of the hanging hooks 8 of the profiles 2.

The main conveyor line 5 passes in cascade through a plurality of pre-treatment stations, a drying station (not shown), and a liquid or powder paint station (not shown).

The paint plant integrates a station 3 for the anodizing treatment of the profiles 2.

The main conveyor line 5 also passes through the anodizing station 3 which is more precisely interposed between two pre-treatment stations 36 and 37.

The anodizing station 3 comprises an oxidation bath 9 and a secondary overhead conveyor 10 movable along a secondary conveyor line 11 in synchronism with the main conveyor 4.

In particular, the secondary conveyor 10 is directly coupled to the main conveyor 4 from which it is driven.

The secondary overhead conveyor 10 too carries a plurality of seats 8b for the insertion of the hanging hooks 8 of the profiles 2, and in general its structure is analogous to that of the main conveyor 4 and therefore it will not be described once again in detail.

The secondary conveyor line 11 too has the shape of a closed ring in order to permit the execution or repeated handling cycles of the secondary conveyor 10.

The moving direction of the main and secondary conveyors 4 and 10 is indicated by suitable arrows in FIG. 1, and the expressions "upstream" and "downstream" used in the following in the desorption naturally refer to the advancing direction indicated by the arrows in FIG. 1.

The main conveyor line 5 has a first main loading segment 12, facing the oxidation bath 9, in which suitable first main loading means 13 are adaptable to transfer the profiles 2 from the main conveyor 4 to the oxidation bath 9.

The secondary conveyor line 11 has in turn a first secondary loading segment 14, facing the oxidation bath 9, in which suitable first secondary loading means 15 are adaptable to transfer the profiles 2 from the secondary conveyor 10 to the oxidation bath 9.

The anodizing station 3 also comprises a wash bath 16 in cascade with the oxidation bath 9.

The main conveyor line 5 has a second main unloading segment 17, facing the wash bath 16, in which suitable second main unloading means 18 are adaptable to transfer the profiles 2 from the wash bath 16 to the main conveyor 4.

The secondary conveyor line 11 has a second secondary unloading segment 19, facing the wash bath 16, in cui suitable second secondary unloading means 20 are adaptable to transfer the profiles 2 from the wash bath 16 to the secondary conveyor 10.

The first main loading segment 12 and the first secondary loading segment 14 are disposed parallel to the longitudinal axis 9a of the oxidation bath 9 and are aligned with a corresponding one of the two longitudinal opposed sides of the oxidation bath 9.

In a similar way the second main unloading segment 17 and the second secondary unloading segment 19 are disposed parallel to the longitudinal axis 16a of the wash bath 16 and are each aligned with a corresponding one of the two longitudinal opposed sides of the wash bath 16.

The axis 9a of the oxidation bath 9 and the axis 16a of the wash bath 16 are preferably one on the extension of the other.

The anodizing station 3 comprises a first diverter 21 which upstream of the oxidation bath 9 transfers to the secondary conveyor 10 at alternate groups 8c the hooks 8 with the hanging profiles 2 conveyed from the main conveyor 4, and a second diverter 22 which, in order to recompose continuously the hanging hooks 8 with the profiles 2 downstream of the oxidation bath 9, and transfers to the segments 8b without hooks 8 of the main conveyor 4 created by the first diverter 21 the groups 8c of hooks 8 transferred by the secondary conveyor 10.

As a consequence, the main conveyor 4 has a continuous succession of hanging hooks 8 of the profiles 2 in the lengths of the main conveyor line 5 upstream of the first diverter 21 and downstream of the second diverter 22, whereas the secondary conveyor 10 does not have hooks 8 in the length of the secondary conveyor line 11 going from the second diverter 22 to the first diverter 21 in the direction indicated by the arrows in FIG. 1.

The groups of hooks 8c can comprise one or more hooks 8, but all groups 8c comprise the same quantity of hooks 8.

The main and secondary conveyors 4 and 10 so have segment with the same length each occupied by a corresponding group 8c of hooks 8 alternating with segments of the same length without hooks 8, being further the same the length of an empty segment or an occupied segment.

Furthermore the length of the segment of the main conveyor line 5 comprised between the first diverter 21 and the second diverter 22 and including the first main loading segment 12 and the second main unloading segment 17 is equal to the length of the segment of the secondary conveyor line 11 comprised between the first diverter 21 and the second diverter 22 and including the first secondary loading segment 14 and the second secondary unloading segment 19.

Finally the length of the segment of the main conveyor line 5 comprised between the first diverter 21 and the first main loading segment 12 is equal to the sum of the length of the secondary conveyor line 11 comprised between the first diverter 21 and the first secondary loading segment 14 and the length of a group 8c of hooks 8.

The first main loading means 13 and respectively the second main unloading meats 18 comprise a first plurality of main swing trays 23 and respectively a second plurality of main swing trays 24 adaptable to be positioned in a reciprocally interchangeable way in the oxidation bath 9 and respectively in the wash bath 16.

Similarly the first secondary loading means 15 and respectively the second secondary unloading means 20 comprise a first plurality of secondary swing trays 25 and respectively a second plurality of secondary swing trays 26 adaptable to be positioned in a reciprocally interchangeable way in the oxidation bath 9 and respectively in the wash bath 16.

Each swing tray 23, 24, 25, 26 has a coupling seat 23a, 24a, 25a, 26a of a hanging hook 8 of a profile 2.

In particular each coupling seat 8a, 8b, 23a, 23b, 23c, 23d consists in a tubular axially open bushing disposed with horizontal axis, whereas each hook 8 comprises at its head a horizontal pin 27 which can be introduced and extracted from a coupling seat 8a, 8b, 23a, 23b, 23c, 23d.

The first and second plurality of main swing trays 23 and 24 like the first and second plurality of secondary swing trays 25 and 26 can be moved according to two mutually orthogonal translation axes, and in particular according to a vertical translation axis for raising and lowering the oxidation bath 9 and the wash bath 16 and according to horizontal translation axis for approaching and moving away from the main and secondary overhead conveyors 4 and 10 for the passage of the hooks 8.

In the first main loading segment 12, in the second main loading segment 17, in the first secondary loading segment 14 and in the second secondary unloading segment 19 a corresponding horizontal conveyor 28, 29, 30 31 is provided for the transfer of the hooks 8 of the profiles 2 between the main and secondary conveyors 4 and 10 and the swing trays 23, 24, 25, 26.

The passage of the hooks 8 occurs in the position in which, following the handling of the swing trays 23, 24, 25, 26 the seats 23a, 24a, 25a, 26a coaxially overlap with the seats 8a, 8b.

The horizontal conveyors 28, 29, 30, 31 have a synchronized actuation for the transfer in the oxidation bath 9 of the groups of profiles 2 present in the first main loading/unloading segment 12 and in the first secondary loading segment 14 together with the transfer of the second main unloading segment 17 to the main conveyor 4 and from the second secondary unloading segment 19 to the secondary conveyor 10 of the groups of profiles 2 present in the wash bath 16.

The transfer of the hooks 8 can statically occur by providing a temporary stop of the main and secondary conveyors 4 and 10 or dynamically with the main conveyor 4 and the secondary conveyor 10 during its movement. The first case is preferred when a greater plant simplification is needed, the second case is preferred when the optimization of the productivity is needed by maintaining the main conveyor 4, and with it the secondary conveyor 10, in a continuous movement for the entire production cycle going from the pre-treatment to the painting of the profiles 2.

The oxidation bath 16 has electrical contact means at the end of the profiles 2 emersed from the oxidation bath 9.

The electrical contact means comprise, for each conveyor 4 and 10, a first single electrical contact 32 and plurality of second electrical contacts 33.

The first electrical contact 32 extends in width parallel to the axis 9a of the oxidation bath 9. The width of the first electrical contact 32 such to permit that it at the same time touches all profiles 2 present in the oxidation bath 9.

The second electrical contacts 33 are disposed in succession in the direction of the axis 9a of the oxidation bath 9 and are facing a side of the profiles 2 opposed to that which faces the first electrical contact 32.

The second electrical contacts 33 have all the same width and are mutually spaced with a constant pitch in the direction of the axis 9° of the oxidation bath 9.

The first contact 32 in movable in a horizontal translation direction orthogonal to the axis 9a of the oxidation bath 9 between a retracting position towards the peripheral portion and a protruding position towards the central portion of the oxidation bath 9.

Similarly the second electric contacts 33 in a reciprocally independent way can be moved in a horizontal translation orthogonal to the axis 9a of the oxidation bath 9 between a retracting position towards the peripheral portion and a protruding position towards the central portion of the oxidation bath 9.

The protruding translatory movement and respectively the retraction movement of the first contact 32 is made in a direction opposed to the protruding one and respectively to the retracting movement of the second contacts 33.

Substantially, the first electric contact 32 and the second independent electric contacts 33 can translate from a position of maximum retraction in which they are mutually moved away in order to permit interposing the profiles 2 to a maximum protruding position in which they approach each other until the first contact 32 goes in contact with one side of the profiles 2 and the second contacts 33 by virtue of a differential translation and they contact, singly or in groups, the opposite side of the profiles 2 by perfectly adapting themselves to the shape and specific dimensions of the single profiles 2 present in the oxidation bath 9 which can also be mutually different.

The profiles 2 are hanging on hooks 8 in the most unfavorable position in which the vertical axis passing through the hanging point is offset with respect to the vertical central axis of the profiles 2 and in particular the offset is such that the profiles 2 have in a common lying plane one of their sides, which then is the one which in the oxidation bath 9 is facing the first contact 32.

The handling of the first electric contact 32 is made by a mechanical or pneumatic actuator able to move the support beam 34 of the first electric contact 32.

Also the handling of each of the second electric contacts 33 is made by a corresponding mechanical or pneumatic actuator.

The actuators of the second electric contacts 33 are supported by a common base 35.

The function of the plant according to the invention is evident according to what was described and illustrated and, in particular, is substantially the following.

The continuous succession of profiles 2 coming from the pre-treatment station 36 upstream of the anodizing station 3 is distributed by the first diverter 21 which for each group 8c of subsequent hooks 8 left pass through the main conveyor line 5 diverts a group 8c of an equal quantity of subsequent hooks 8 towards the secondary conveyor line 11.

On the main conveyor line 5 a certain number of groups 8c of hooks 8 is formed, in which each group 8c of hooks 8 is separated from the previous one and from the subsequent one through a space 8b without hooks 8 having a length equal to that occupied by a group 8c of hooks 8.

Similarly on the secondary conveyor line 11 the same number of groups 8c of hooks 8 is formed, in which each group 8c of hooks 8 is separated by the previous one and from the subsequent one through a space 8b without hooks 8 having a length equal to that occupied by a group 8c of hooks 8.

Between the main conveyor line 5 and the secondary conveyor line 11 an offset is in this way created of a pitch equal to the length occupied by a group 8c of hooks 8, so that at the second diverter 22 each group 8c of hooks 8 coming from the secondary conveyor line 11 is introduced in a space 8b without hooks 8 present between two subsequent groups 8c of hooks 8 of the main conveyor line 5 in order to recompose the complete succession of hooks 8 in the main conveyor line 5 downstream of the second diverter 22.

The first diverter 21 and the second diverter 22 make the exchange of the hooks 8 through a respective horizontal conveyor (not shown) which is periodically actuated every time the couple of seats 8a, 8b, 23a, 24a, 25a, 26a coaxially overlap in order to couple the hooks 8 to transfer between the main conveyor 4 and the secondary conveyor 10. The oxidation and wash treatment in the anodizing station 9 is made as follows.

When in the first main loading segments 12 and secondary loading segments 14 at the two sides of the oxidation bath 9 the two groups of profiles 8 to treat are present, the swing trays 23, 25 present at the oxidation bath 9 are empty, the swing trays 24, 26 present in the wash bath 16 are occupied by the oxidized and washed profiles 2, and the second main unloading segments 17 and secondary unloading segments 19 at the two sides of the wash bath 16 are empty.

The swing trays 23, 25 present at the oxidation bath 9 take the two groups of profiles 2 to oxidize and dip them in the oxidation bath 9, and at the same time the swing trays 24, 26 present at the wash bath 16 transfer the two groups of oxidized and washed profiles 2 to the second main unloading segments 17 and secondary unloading segments 19.

Then the two groups of profiles 2 associated to the swing trays 23 and 25 are held stationary inside the oxidation bath 9 for the treatment duration necessary at the termination of which the swing trays 23 and 25 supporting them transfer them in the wash bath 16 where they are held stationary for the necessary wash duration, whereas the empty swing trays 24 and 6 present in the wash bath 16 move in the oxidation bath 9 for preparing the takeout of the subsequent groups of profiles 2 to be treated.

Naturally the plant control unit must correlate the advancement speed of the main 4 and secondary conveyor 10, the permanence times of the profiles 2 in the oxidation bath 9 and in the wash bath 16, the transfer times of the hooks 6 from the oxidation bath 9 to the wash bath 16, and the stopping times of the main 4 and secondary conveyor 10, if provided for the exchange of the hooks 8, in order to permit the correct exchange of the hooks 8 at the first main and secondary loading segments 12, 14 and of the second main and secondary unloading segments 17, 19.

In particular the same group of profiles 2 which through the swing trays 23, 25 present at the oxidation bath 9 is taken from the first main 12 and respectively secondary 14 loading segment, must be transferred to the second main 17 and respectively secondary 19 unloading segment through the swing trays 18, 20 present at the wash bath 16 in order to fill the same void that the same has left on the main 4 and respectively secondary conveyor 10 in order to be submitted to the oxidation and the subsequent wash.

The treatment cycle in the oxidation bath, with reference to a single group of profiles 2, is the following.

The first contact 32 and the second contacts 33 are brought in the position of maximum aperture, that is the maximum mutual distance.

The swing trays lower the profiles 2 interposed between the first contact 32 and the second contacts 33 with their coplanar side facing the first contact 32.

The first contact 32 moves towards the fully closed position and at the same time the second contacts 33 move in the opposite direction towards the fully closed position. In the end position the first electric contract 32 contacts the coplanar side of all profiles 2 and the second electric contacts 33 contact with their opposite side of the profiles 2 but they will not have all the same closed position as each assumes a closed position determined by the shape and variable dimension of each profile 2, whereas the fully closed position is just occupied by those second contacts 33 which do not find their interference with a profile 2 in their translation stroke.

The anodizing treatment station in a vertical paint plant so conceived is susceptible to numerous changes and variations, all within the scope of the inventive concept; furthermore all details can be substituted by technically equivalent elements.

In practice the used materials, and also the dimensions, can be of any kind according to the needs and the state of the art.

The invention claimed is:

1. An anodizing treatment station in a vertical paint plant of aluminum profiles hanging in succession by hooks on a main overhead conveyor moving along a main conveyor line which passes through at least one pre-treatment station and at least one powder or liquid paint station, comprising:
   at least one oxidation bath; and
   a secondary overhead conveyor moving along a secondary conveyor line in synchronism with the main overhead conveyor;
   the main conveyor line has a first main loading and/or unloading segment facing the oxidation bath, wherein a first main loading and/or unloading mechanism is adapted to transfer groups of hooks from the main overhead conveyor to the oxidation bath, or vice versa;
   the secondary conveyor line has a first secondary loading and/or unloading segment facing the oxidation bath, wherein a first secondary loading and/or unloading mechanism is adapted to transfer groups of hooks from the secondary overhead conveyor to the oxidation bath, or vice versa;
   a first diverter which, upstream of the oxidation bath, alternately transfers to the secondary overhead conveyor, groups of hooks conveyed by the main overhead conveyor; and a second diverter, which to recompose the continuous succession of hooks downstream of the oxidation bath, alternately transfers back to the main overhead conveyor, the groups of hooks conveyed to the secondary overhead conveyor at the first diverter.

2. The anodizing treatment station in a vertical paint plant of claim 1, wherein the length of the segment of the main conveyor line between the first and the second diverter, which includes the first main loading and/or unloading segment, is equal to the length of the segment of the secondary conveyor line between the first and the second diverter, which includes the first secondary loading and/or unloading segment.

3. The anodizing treatment station in a vertical paint plant of claim 1, wherein the length of the segment of the main conveyor line between the first diverter and the first main loading and/or unloading segment is equal to the sum of the length of the segment of the secondary conveyor line between the first diverter and the first secondary loading and/or unloading segment and of the length occupied by a group of hooks on the main overhead conveyor or the secondary overhead conveyor.

4. The anodizing treatment station in a vertical paint plant of claim 1, wherein all of the groups of hooks present in the main and the secondary overhead conveyors each have the same number of hooks and each occupy a segment of the same length in the main and the secondary overhead conveyors.

5. The anodizing treatment station in a vertical paint plant of claim 1, further comprising at least one wash bath in cascade with the oxidation bath, wherein:
the main conveyor line has a second main loading and/or unloading segment facing the wash bath;
a second main loading and/or unloading mechanism is adapted to transfer groups of hooks from said main overhead conveyor to the wash bath, or vice versa;
the secondary conveyor line has a second secondary loading and/or unloading segment facing the wash bath; and
a second secondary loading and/or unloading mechanism is adapted to transfer groups of hooks from said secondary overhead conveyor to the wash bath, or vice versa.

6. The anodizing treatment station in a vertical paint plant of claim 5, wherein the first and the second main loading and/or unloading mechanisms include a first and a second plurality of main swing trays positionable in a reciprocally interchangeable manner in the oxidation bath and in the wash bath, wherein the first and the second secondary loading and/or unloading mechanisms include a first and a second plurality of secondary swing trays positionable in a reciprocally interchangeable manner in the oxidation bath and in the wash bath, and wherein each swing tray has a removable coupling seat of a profile hanging hook.

7. The anodizing treatment station in a vertical paint plant of claim 6, further comprising a corresponding horizontal conveyor in each of the first main loading and/or unloading segment, the second main loading and/or unloading segment, the first secondary loading and/or unloading segment, and the second secondary loading and/or unloading segment, to transfer hooks from the main and the secondary conveyors to the swing trays, and vice versa.

8. The anodizing treatment station in a vertical paint plant of claim 7, wherein horizontal conveyors have a synchronized drive for transfer to the oxidation bath of each group of hooks present in the first main loading and/or unloading segment, and vice versa, simultaneous to transfers to the main and the secondary overhead conveyors of each group of hooks present in the wash bath, and vice versa.

9. The anodizing treatment station in a vertical paint plant of claim 5, wherein transfer to the oxidation bath of each group of hooks present in the first main loading and/or unloading segment, and vice versa, simultaneous to transfer to the main and the secondary overhead conveyors of each group of hooks present in the wash bath, and vice versa, is performed dynamically with the main and the secondary overhead conveyors in movement.

10. The anodizing treatment station in a vertical paint plant of claim 5, wherein transfer to the oxidation bath of each group of hooks present in the first main loading and/or unloading segment, and vice versa, simultaneous to transfer to the main and the secondary overhead conveyors of each group of hooks present in the wash bath, and vice versa, is performed statically by temporarily stopping the main and the secondary overhead conveyors.

11. The anodizing treatment station in a vertical paint plant of claim 1, wherein the oxidation bath has electric contacts at an immersed end of the profiles, the contacts comprising a first single electric contact of suitable width to touch all of the profiles hanging on at least one group of hooks and a plurality of second electric contacts movable separately from one another.

12. The anodizing treatment station in a vertical paint plant of claim 11, wherein the first single electric contact and the plurality of second separate electric contacts can move parallel in opposite directions reciprocally away from each other to a position allowing an interposing of the profiles and reciprocally towards each other to a position in which the first single electric contact is in contact with a first side of the profiles and the second separate electric contacts, as a result of a differential movement, are in contact, individually or in groups, with a second side of the profiles.

13. The anodizing treatment station in a vertical paint plant of claim 12, wherein the second separate electric contacts all have the same width.

14. The anodizing treatment station in a vertical paint plant of claim 12, wherein the second separate electric contacts have a constant spacing.

* * * * *